No. 746,717. PATENTED DEC. 15, 1903.
W. B. LONG.
WHEEL PAINTING APPARATUS.
APPLICATION FILED APR. 18, 1903.
NO MODEL. 2 SHEETS—SHEET 1.
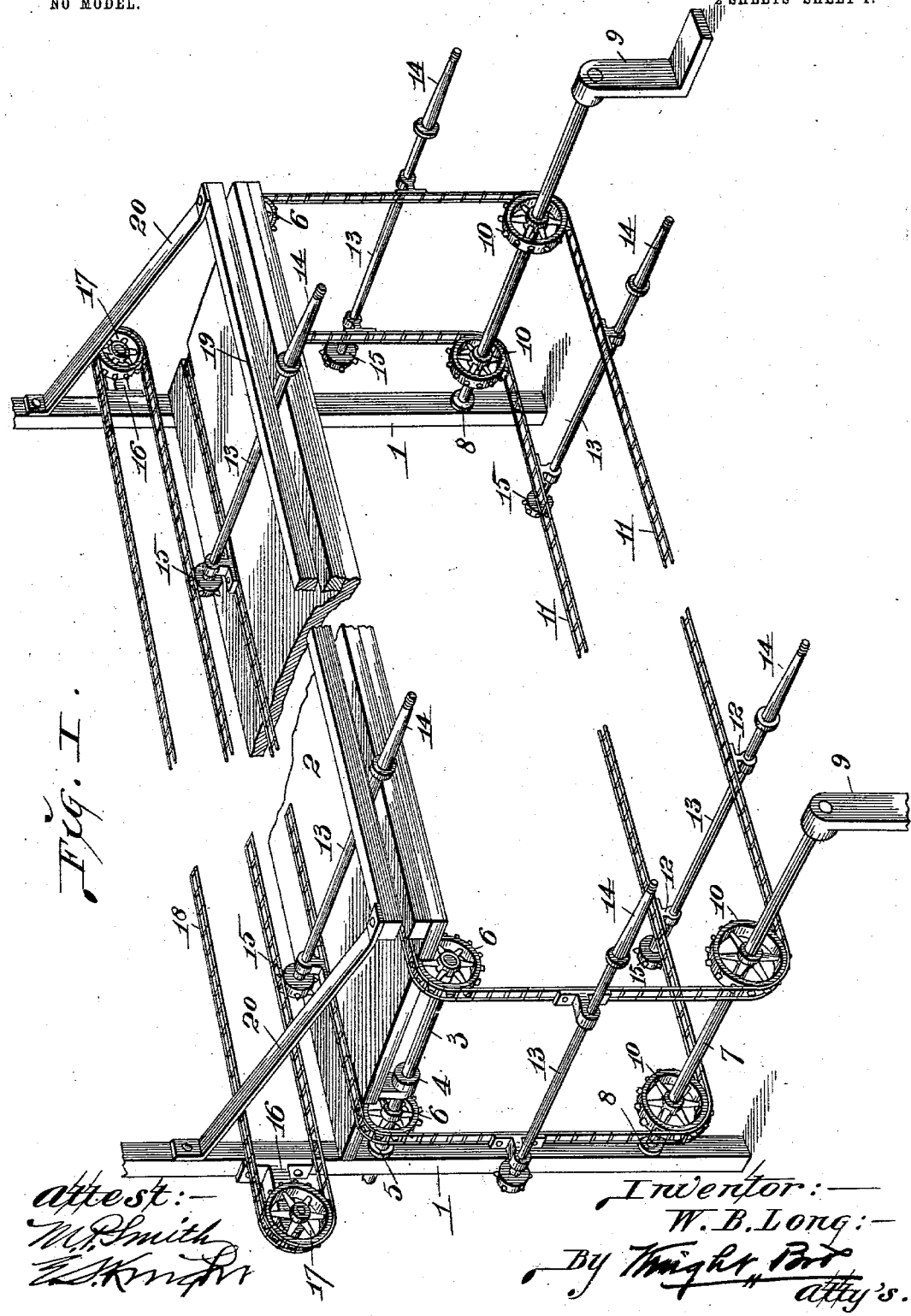
Fig. I.
Attest:
M. P. Smith
E. S. Knight
Inventor:
W. B. Long:—
By Wright Bro
Atty's.

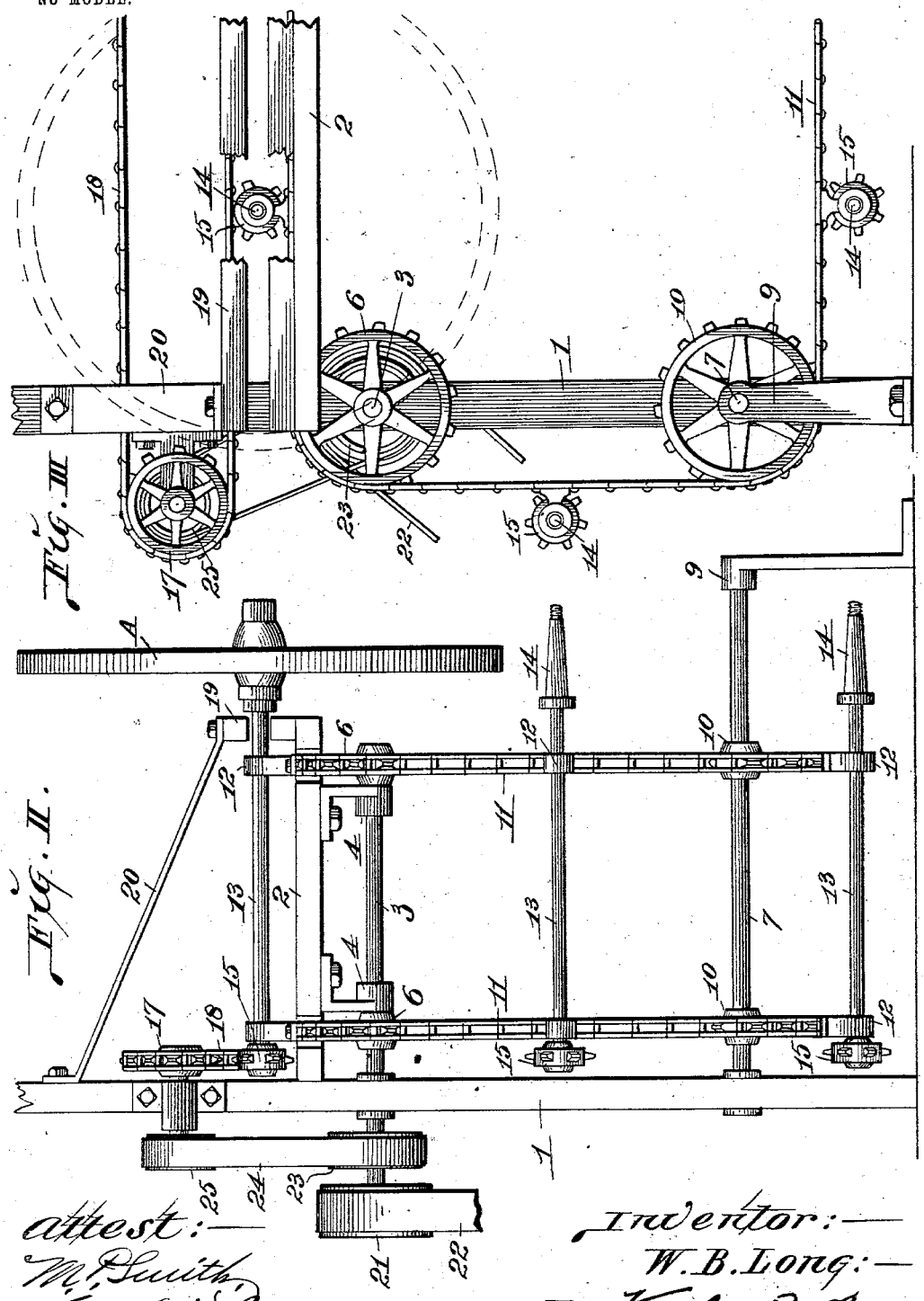

No. 746,717. Patented December 15, 1903.

UNITED STATES PATENT OFFICE.

WALTER B. LONG, OF CLEVELAND, OHIO.

WHEEL-PAINTING APPARATUS.

SPECIFICATION forming part of Letters Patent No. 746,717, dated December 15, 1903.

Application filed April 18, 1903. Serial No. 153,234. (No model.)

*To all whom it may concern:*

Be it known that I, WALTER B. LONG, a citizen of the United States, residing in Cleveland, in the county of Cuyahoga and State of Ohio, have invented certain new and useful Improvements in Wheel-Painting Apparatus, of which the following is a full, clear, and exact description, reference being had to the accompanying drawings, forming part of this specification.

My invention relates to mechanical means for rotating vehicle-wheels after they have been dipped into paint and by which the paint is caused to spread in even distribution over the surfaces of the wheels to effect smooth uniform painted surfaces.

My invention consists in features of novelty hereinafter fully described, and pointed out in the claims.

Figure I is a perspective view of the apparatus. Fig. II is an end elevation. Fig. III is an enlarged front view of one end of the apparatus.

1 designates posts that are suitably supported, and 2 is a horizontal shelf positioned in front of said posts.

3 designates horizontal shafts positioned beneath the ends of the shelf 2 and mounted in hangers 4, suspended from the shelf and in bearing-boxes 5, mounted on the posts 1. Fixed to each shaft 3 is a pair of toothed wheels 6, positioned apart from each other, as seen in Figs. I and II.

7 designates horizontal shafts located beneath the shafts 3 and journaled in bearing-boxes 8, mounted on the posts 1 and standards 9. Fixed to the shafts 7 are pairs of toothed guide-wheels 10, that are separated from each other distances corresponding to the spacing of the toothed wheels 6.

11 designates endless conveyer-chains that are arranged to travel on the toothed wheels 6 and 10 and traverse the shelf 2. Attached to the chains 11 at intervals are bearing-boxes 12 in alinement with each other in pairs.

13 designates rotatable rods journaled in the bearing-boxes 12 and bearing at their outer ends spindles 14, that are adapted to receive vehicle-wheels that are placed thereon after being dipped in paint and are rotated with the shafts 13 in the operation of the apparatus in the manner hereinafter explained. Fixed to the rear end of each rotatable rod 13 is a spur-wheel 15.

16 designates brackets mounted on the posts 1 at a greater elevation than the shelf 2, and 17 represents toothed wheels journaled to said brackets.

18 is an endless chain mounted on the toothed wheel 17 to travel in the path above the shelf 2 and in line with the spur-wheels 15 during the period of their movement across said shelf.

19 is a guard-bar extending longitudinally of the shelf 2 above its forward edge and supported by arms 20, that are secured to the posts 1.

21 designates a drive-pulley fixed to one of the shafts 3, and to which power is applied through a drive-belt 22, leading from a suitable source of power. Through the drive-pulley 21 rotation is imparted to the shaft 3, to which it is fixed, and the toothed wheels 6 being thereby rotated motion is imparted to the endless carrier-chains 11. On the shaft 3, bearing the drive-pulley 21, is a second pulley 23, that receives a belt 24, which leads to a pulley 25, mounted on the shaft of one of the toothed wheels 17 and through the medium of which movement is imparted to the endless chain 18.

In the practical use of my apparatus the vehicle-wheels, as indicated by A, Fig. II, are placed on the spindles 14 of the rotatable rods 13 after being dipped in paint and then through a slow travel of the endless conveyer chains 11, imparted thereto by the driving mechanism, the rotatable rods are conveyed longitudinally of the shelf 2. As the rods 13 traverse the shelf their spur-wheels 15 are engaged by the endless chains 18, and during such engagement, the endless chain being in motion, causes rotation of the spur-wheels 15 to rotate the rods 13 and the wheel mounted on the spindles thereof. The speed of travel of the carrier-chains 11 is just sufficient to prevent the paint on the wheels from running thereon during their rotation, and the speed being slow ample time is afforded for he paint to dry on the wheels during the period of their travel the length of the shelf 2, so that when the wheels have reached the far end of the shelf from that at which they were started the paint is in a hard condition, and the wheels are removed. The guard-bar 19, being positioned above the outer ends of the rotatable rods 13, serves to prevent the upward movement of said rods while they are traversing the shelf 2.

I claim as my invention—

1. In a wheel-painting apparatus, the combination of an endless carrier, a support for said carrier, rotatable wheel-carrying rods journaled at intervals to said carrier, and means for rotating said rods, substantially as set forth.

2. In a wheel-painting apparatus, the combination of an endless carrier, rotatable wheel-carrying rods journaled at intervals to said carrier, and an endless driving-chain arranged to engage and rotate said rods, substantially as set forth.

3. In a wheel-painting apparatus, the combination of an endless carrier, rotatable wheel-carrying rods journaled at intervals to said carrier, spur-wheels fixed to said rods, and an endless driving-chain arranged to engage said spur-wheels, substantially as set forth.

4. In a wheel-painting apparatus, the combination of a shelf, an endless carrier arranged to traverse said shelf, rotatable wheel-carrying rods journaled at intervals to said carrier, and an endless driving-chain arranged to engage and rotate said rods, substantially as set forth.

5. In a wheel-painting apparatus, the combination of a shelf, an endless carrier arranged to traverse said shelf, rotatable wheel-carrying rods journaled at intervals to said carrier, spur-wheels fixed to said rotatable rods, and an endless driving-chain arranged to engage said spur-wheels, substantially as set forth.

6. In a wheel-painting apparatus, the combination of an endless carrier, rotatable rods journaled at intervals to said carrier, wheel-receiving spindles carried by said rods, spur-wheels fixed to said rods, and an endless driving-chain arranged to engage said spur-wheels, substantially as set forth.

7. In a wheel-painting apparatus, the combination of a pair of conveyer-chains, journal-bearings fixed to said chains at intervals, rotatable wheel-carrying rods journaled in said bearings, spur-wheels fixed to said rods, and an endless driving-chain arranged to engage said spur-wheels, substantially as set forth.

8. In a wheel-painting apparatus, the combination of a shelf, and an endless carrier arranged to traverse said shelf, rotatable wheel-carrying rods journaled at intervals to said carrier, means for rotating said rods as they traverse said shelf, and a guard-bar surmounting said shelf above the path of travel of said rotatable rods, substantially as set forth.

WALTER B. LONG.

In presence of—
Z. E. L. LONG,
EDWIN F. BAILIE.